J. W. TYSON
Wheel Cultivator.
No. 57,222.
Patented Aug. 14, 1866.
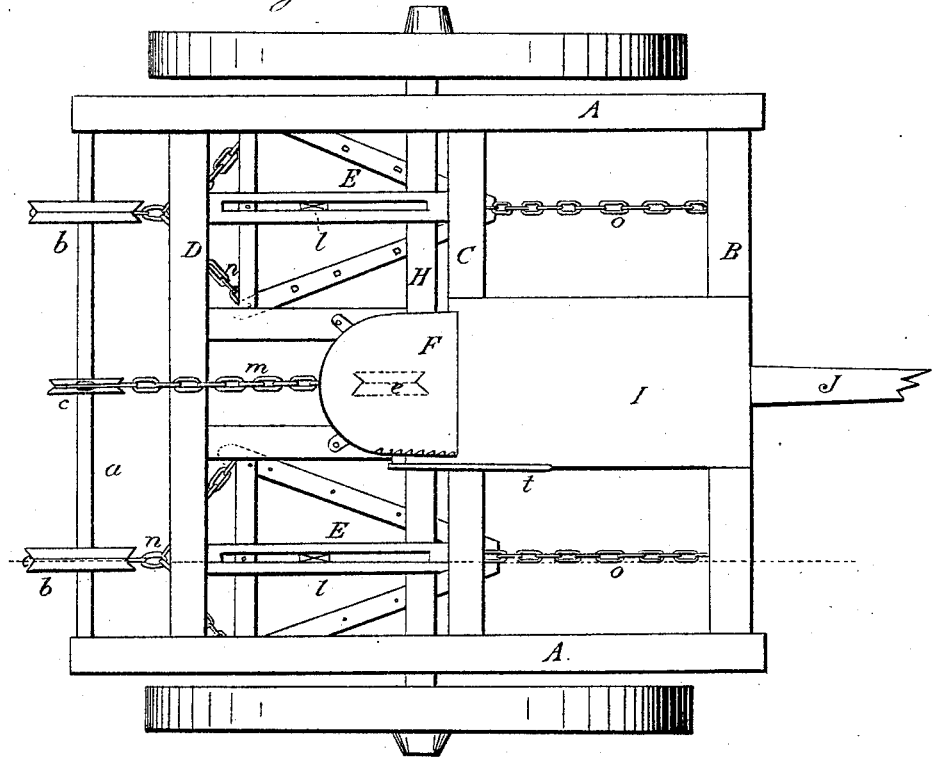
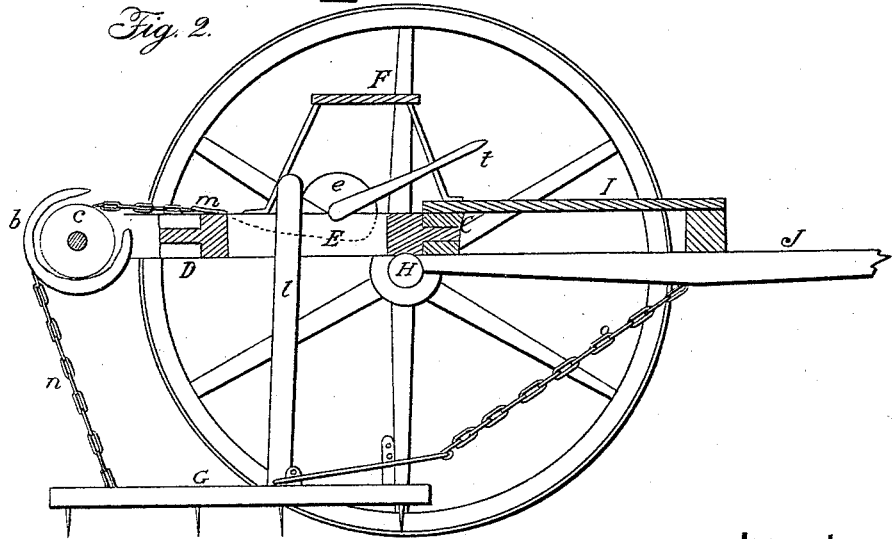
Witnesses:
P. T. Dodge
W. S. McGill
Inventor:
J. W. Tyson
By H. C. Dodge
Attorney

UNITED STATES PATENT OFFICE.

J. W. TYSON, OF LOWER PROVIDENCE, PENNSYLVANIA.

IMPROVEMENT IN CULTIVATORS.

Specification forming part of Letters Patent No. 57,222, dated August 14, 1866.

*To all whom it may concern:*

Be it known that I, JOHN W. TYSON, of Lower Providence, in the county of Montgomery and State of Pennsylvania, have invented certain new and useful Improvements in Cultivating-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in a novel manner of constructing a frame on wheels for the attachment of harrows, cultivators, and plows, and of adjusting the same for the purpose of preparing the ground for crops, and for cultivating the crops while growing.

Figure 1 is a top-plan view, and Fig. 2 is a longitudinal vertical section taken on the line $x\ x$ of Fig. 1.

I construct a frame consisting of two or more side bars, A, with the cross-bars B C D, arranged as shown, or in any equivalent manner. The frame may be of any required size, and its cross-bars C and D are slotted transversely, as shown in section in Fig. 2, to receive the ends of the short bars E, which have tenons formed thereon for that purpose. The bars E are also slotted vertically, as shown in Fig. 2, to receive and hold the guide-post $l$, attached to the cultivator G, or other implement intended to be used therewith. The frame thus constructed is mounted on the axle H. This is provided at each end with wheels, like an ordinary cultivator or cart. A seat, F, is mounted over the axle, and a foot-board, I, is placed in front thereof, as shown clearly in the drawings.

A shaft, $a$, is placed transversely at the rear end of the frame, and on this shaft is secured a central pulley, $c$, while midway between the pulley $c$ and the end of the shaft, on each side of $c$, is secured another pulley, $b$, of larger diameter, as shown in Fig. 1.

Under the seat is secured a shaft having a pulley, $e$, thereon, having a handle, $t$, attached, as shown. A chain, $m$, or cord passes from the front side of the pulley $e$ underneath it, and back to and over the pulley $c$ on shaft $a$.

If it be desired to cultivate corn or any similar crop, two small cultivators, as represented by G, Fig. 2, are suspended under the mounted frame in the manner shown, a chain, $o$, extending from their front end up to the front of the main frame, where it is secured permanently. From their rear end two chains, $n$, extend upward and unite, as shown in Fig. 1, after which they are attached to the pulleys $b$, as shown in the drawings. By throwing the lever $t$ forward the chains $m$ and $n$ are unwound, and the cultivators are thereby lowered to the ground and are ready for operation.

When it is desired to elevate them or raise them entirely from contact with the earth, the lever $t$ is drawn backward and it is done.

A post, $l$, is secured rigidly to the cultivator, and projects upward and passes loosely through the slot in the bar E, thereby serving to prevent the cultivator G from being shoved to one or the other side as it is drawn along, and by moving the bars E the cultivators can be adjusted laterally, as may be necessary to suit the rows of the crop being cultivated.

It is obvious that instead of the cultivators G, a couple of small plows may be substituted, and the machine then used for furrowing or marking out land for planting with corn or any similar crop; or, if desired, a harrow may be attached in the same manner, and used for harrowing the ground for any desired purpose. So, too, one or more plows may be thus attached, and the machine be then used as a gang-plow. By this arrangement the farmer is provided with an implement that is capable of use for a variety of purposes, and in connection with which the ordinary farm implements may be used, thus saving much expense in the purchase of separate implements.

Having thus described my invention, what I claim is—

The mounted frame provided with the laterally-adjustable and longitudinally-slotted bars E, as and for the purpose set forth.

JOHN W. TYSON.

Witnesses:
 W. C. DODGE,
 P. T. DODGE.